US006971409B2

(12) United States Patent
Reichwein et al.

(10) Patent No.: US 6,971,409 B2
(45) Date of Patent: Dec. 6, 2005

(54) METHOD AND APPARATUS FOR THE TREATMENT OF FLUIDS

(76) Inventors: Dietrich Reichwein, Bergstrasse 6 Top 26, Zell am See (AT) A-5700; Olaf Peters, Holztratten 17, Dellach/Drau (AT) A-9772

( * ) Notice: Subject to any disclaimer, the term of this patent is extended or adjusted under 35 U.S.C. 154(b) by 172 days.

(21) Appl. No.: 10/431,417

(22) Filed: May 7, 2003

(65) Prior Publication Data

US 2004/0221903 A1 Nov. 11, 2004

(51) Int. Cl.[7] .............................. G05D 7/03; F16C 1/04
(52) U.S. Cl. ........................ 137/827; 138/42; 138/44; 210/222; 210/695
(58) Field of Search .................... 137/827; 138/40–46; 210/695, 222, 223; 251/118

(56) References Cited

U.S. PATENT DOCUMENTS

| 5,354,521 A | * | 10/1994 | Goodman ............... 264/429 |
| 5,753,124 A | * | 5/1998 | Bogatin et al. ........... 210/222 |
| 6,482,318 B1 | | 11/2002 | Reichwein et al. ........ 210/222 |
| 6,641,725 B1 | * | 11/2003 | Barnes ...................... 210/222 |
| 2002/0056666 A1 | * | 5/2002 | Sharaf ...................... 209/214 |

FOREIGN PATENT DOCUMENTS

| DE | 004223628 | * | 1/1994 | ............. 210/222 |
| DE | 195 43 573 A1 | | 11/1995 | ............. H01F 5/00 |
| EP | 0 357 102 A2 | | 7/1989 | ............. C02F 1/48 |
| EP | 0 670 288 A1 | | 9/1995 | ............. C02F 1/48 |
| GB | WO 98/30501 | | 7/1998 | ............. C02F 1/00 |
| JP | 9-314135 | | 12/1997 | ............. C02F 1/30 |

OTHER PUBLICATIONS

"Magnetic Water Treatment and Magnetic Fuel Treatment" (Skeptical Inquirer . . . Seite 1 von 8), Feb. 1998, vol. 22, No. 1.
Chemistry of the Elements, §14.2.2, pp. 729-732, N.N. Greenwood and A. Earnshow, Department of Inorganic and Structural Chemistry University of Leeds, U.K.

* cited by examiner

Primary Examiner—Kevin Lee
(74) Attorney, Agent, or Firm—Brinks Hofer Gilson Lione (57) ABSTRACT

A flow pipe and one or more permanent magnets placed in or on the flow pipe, each permanent magnet presenting at its axial ends an infinite divergence of the magnetic field it generates. Fluid is treated by flowing through a flow pipe equipped with at least one such permanent magnet. The permanent magnet can be made of a plastic coextrudate with a ferromagnetic material such as iron powder, iron dust or iron chips. The permanent magnets can be arranged in groups with flow turbulence initiators positioned within the flow pipe between the magnet groups.

15 Claims, 8 Drawing Sheets

METHOD AND APPARATUS FOR THE TREATMENT OF FLUIDS

BACKGROUND OF THE INVENTION

The present application relates to apparatus and methods for treating fluids. Such apparatus and methods are often required wherever fluids are used in the execution of a process or needed as an end product. Such need typically exists in the beverage industry, with regard to drinking water, water for general use, surface and depth water, industrial water of any kind as well as technical fluids of any kind, i.e., fuels and combustibles, or also water used in the cooling cycle of combustion engines.

Water from different sources presents a significant difference in quality as compared to common surface waters and depth waters, respectively.

Natural spring water typically drops from large heights onto rocks and forces very fine, non-neutral colloids out of the rock on impact. Driven by mass attraction these colloids intercalate between the two H atoms and, owing to their electrical charge, possibly enlarge the bonding angle.

There are several known fluid treatment apparatus and devices currently available, which are successfully used for many different tasks, such as extremely fine-filtering, reversed osmosis, the elimination of sediments on pipe walls as well as various separation and sterilization tasks. Additionally, methods have been developed, which mix certain amounts of artificially produced charged colloids with water to imitate the natural process affecting spring water. The disadvantages of these methods are the costs of producing the colloids and the lack of precision in applying a precise amount of colloid particles appropriate for the treated amount of water.

The object of the invention described herein is to offer an apparatus and a method for treating fluids having advantages over the prior methods and apparatus.

SUMMARY OF THE INVENTION

This object is achieved by an apparatus characterized by a flow pipe and at least one permanent magnet surrounding the flow pipe and/or placed in or on this pipe, the permanent magnet presenting at its axial ends an infinite divergence of the magnetic field it generates. Fluid is treated by causing the fluid to flow through a flow pipe equipped with at least one such permanent magnet. One or more of the permanent magnets can take the form of a sleeve which is adjacent to or arranged on the outside or inside of the flow pipe wall.

The at least one permanent magnet can be made of or consist of a plastic coextrudate with a ferromagnetic material, in particular iron powder, iron dust or iron chips.

The apparatus can include at least one device for generating turbulent flow conditions inside the flow pipe, which can also be in the form of one or more permanent magnets. The device for generating turbulent flow conditions can be of varying size and can take the form of a conical disc, a flow disc, a vortex body and/or a central core and/or middle spike. The turbulent flow condition generator can take the form of several form-fitting conical discs and/or flow discs that can be arranged serially in such a way that the edge of the larger opening of each following conical disc and/or flow disc sits on the smaller opening of the preceding conical disc and/or flow disc.

The turbulent flow condition generator can also take the form of several conical discs and/or flow discs with an outer wall and a middle spike that can be arranged serially in flow direction to control turbulent flow conditions so that the openings between the outer wall and the middle spike of neighboring discs have different cross-sections and/or can be offset against each other. Several of the conical discs or groups of neighboring conical discs can be arranged in the flow pipe in flow direction with space between them.

The vortex bodies can take the form of one or more beads, which can be made of glass, that can be positioned in the flow pipe, preferably between neighboring turbulent flow condition generators.

The present invention is intended for the improvement of the characteristics of fluids, such as water, which is predominantly found in polymer cluster formations. The solution offered by the present invention is based on the observation that the quality of fluids, such as water, is changed if an appropriate layout is used and if such fluids are moved a predetermined speed into monopolar and/or quasi-single pole magnetic fields of permanent magnets.

The method and the apparatus in accordance with the present invention can be used for treating fresh water, stagnant water, industrial effluent, surface and depth water as well as industrial water of any kind. They are also useful for treating technical fluids, such as fuels or combustibles.

The method applies familiar mono-, bi- and/or tri-polar permanent magnets, as such known to be suitable for the treatment of water. These magnets are typically characterized by magnetic field lines, which assume the topology of a Klein bottle. Such permanent magnets are described by Shinichi SEIKE, "The Principles of Ultrarelativity," Space Research Institute, Uwajima, Nonomiya Press, JAPAN.

If such permanent magnets are used they produce magnetic quasi-single poles in which both ends of the magnet have the same polarity whereas the opposite pole is found in the middle of the magnet. For example, two-thirds ($2/3$) of the field force is present at the end poles and one-third ($1/3$) in the middle of the magnet. Since magnetic field lines always form a closed loop, one-sixth of each pole end field cannot be compensated by the middle pole, thus creating an infinite divergence (div= ) similar to electrical field lines.

If water flows through such open field lines, its structure will change.

In accordance with the invention, any number of mono-, bi- and/or tri-polar permanent magnets—however at least one—with an infinite divergence are placed around, over or inside a flow pipe. The shape and the type of the pipe as well as the type of the installation as well as the arrangement of the individual permanent magnets to one another, i.e. relating to their number and polarity, can be customized to the particular circumstances.

The permanent magnets can be arranged as sleeves inside and/or outside the flow pipe.

Turbulent flow conditions in the flow pipe offer certain advantages over laminar flow. Flow speed, field force and length of exposure to the magnetic field need to be in correlation to each other. Just as in natural sources, arbitrary mixtures of polymer cluster chains and liquid crystals will form below the flow dependent parameters.

To generate the appropriate turbulent flow, it is advantageous to place conical discs inside the flow pipe at the input and outlet opening of the device. At least one conical disc is required. However, several discs can also be placed serially behind one another.

Besides the serial placement, it is possible to arrange the conical discs individually or in groups along the flow pipe leaving space between them. Additionally, part or all of the flow pipe can contain vortex bodies and/or central cores between the vortex or conical discs (or even in the absence of any conical discs). The central cores can be arranged in central symmetry on the central axis of the flow pipe, so that the liquid flows around the central cores. Glass beads of various sizes are particularly suited for use as vortex bodies. This will assure that turbulent flow occurs at all possible flow speeds along the full effective length of the magnetic field. It is preferable that the sleeves, the vortex and/or the conical discs and/or the central cores can take the form of mono-, bi- or tri-polar magnets, which can then be arranged in any orientation and magnetic polarity to one another.

The quasi-single pole permanent magnets in accordance with the invention can be best provided by reacting a magnetizable material with a magnetic field from a Klein coil. Such Klein coils produce for their part a desired magnetic field with an infinite divergence on both of their ends.

It is advantageous to produce a vortex disc, central core and the like in accordance with the invention by extruding a synthetic substance in the field of a Klein coil to form the vortex disc or the central core and admixing a ferromagnetic substance (co-extrusion), such as iron powder or iron chips.

The apparatus and method in accordance with the invention can be used very advantageously for generating high-quality water, e.g., in the beverage industry. The processes that produce high-quality spring water in nature can now be technically imitated and performed. Additionally, the apparatus and method in accordance with the invention can also be used in the cooling cycle of combustion engines. Coolant that has been treated in accordance with the invention will help to flush out deposits in the engine and, unlike regular coolant, will leave no deposits behind. The water-flushed volume will be kept clean so that heat transmission coefficients pursuant to the engine specifications will be achieved for the life of the engine.

It has also been shown that fuels and combustibles treated in accordance with the invention lead to significant improvements in fuel utilization due to the improved atomization, which can be achieved by employing the apparatus and method. Additionally, complete combustion leads to significantly reduced exhaust emissions. This effect is explained as a result of the enhanced diffusion of the fuels, which changes droplets into a fine fuel mist.

The following section will describe a few examples of apparatus and methods in accordance with the invention in relation to the included drawings.

DESCRIPTION OF PREFERRED EMBODIMENTS

Figure 1:
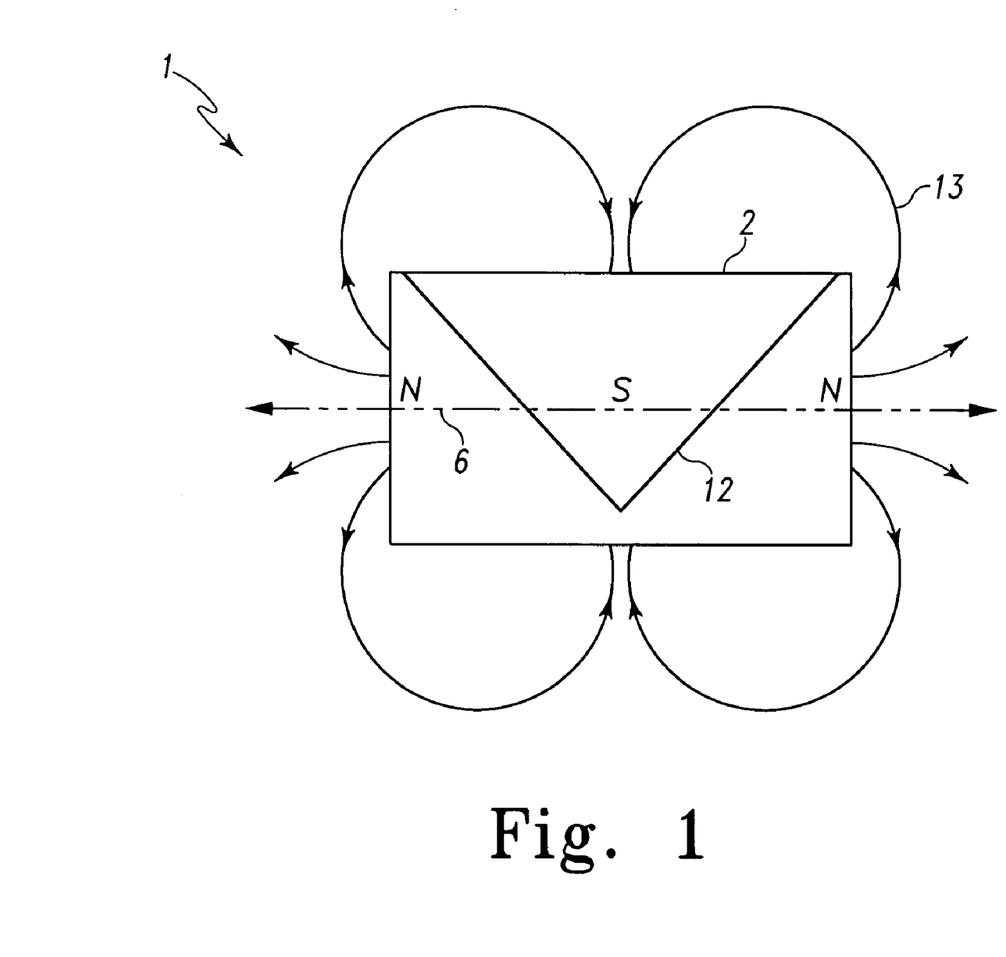
FIG. 1 is a schematic illustration the magnetic field distribution of a prior art Klein double coil.

FIG. 1 shows a Klein double coil 1 used for the production of a permanent magnet used in the present invention. The coil 1 contains a coil core 2 around which, similar to a regular coil, rings of electrical wire are placed in individual windings. Different from regular technical methods, however, these windings are placed around the coil core 2 in "half strokes" to form a V-shaped knot line 12. The direction of the coil windings is reversed at the tip of the V in the knot line 12 resulting in a placement of the knots in an upward direction. Thus, the Klein coil consists of opposing wire wrappings. All these factors contribute to a magnetic field distribution, as indicated by the field lines 13, whenever a direct current flows through the coil 1. Additional information about such Klein coils is available from our earlier U.S. Pat. No. 6,482,318.

Figure 2:
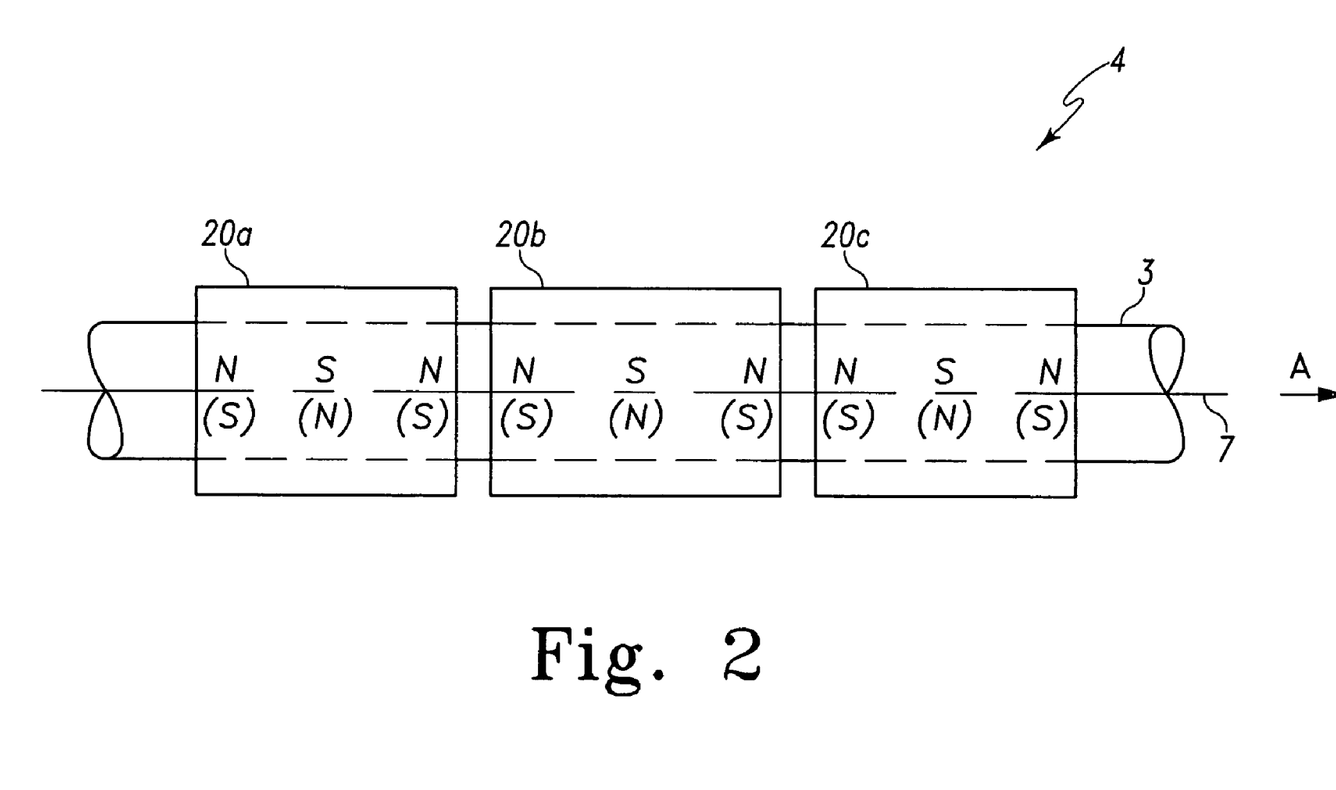
FIG. 2 is a side elevation of a first apparatus in accordance with the invention.

FIG. 2 shows an apparatus 4 in accordance with the invention equipped with a flow pipe 3, which is surrounded by altogether three permanent magnets 20a, 20b, and 20c. The permanent magnets 20a, 20b, and 20c present a magnetic south in the center and a magnetic north in each of their ends with a finite divergence of the field distribution. The arrangement of the magnetic poles is indicated for the individual permanent magnets. An alternative polarization of the polar magnets is indicated in brackets in FIG. 2. The whole assembly 4 creates a rotational symmetry around the axis of the permanent magnets 20a, 20b, and 20c as well as around the axis 7 of the flow pipe 3. If water flows through the flow pipe 3 in the direction of the arrow A in the presence of the permanent magnets 20a, 20b, and 20c, the water will be treated by the magnetic fields of the assembly 4.

Figure 3:
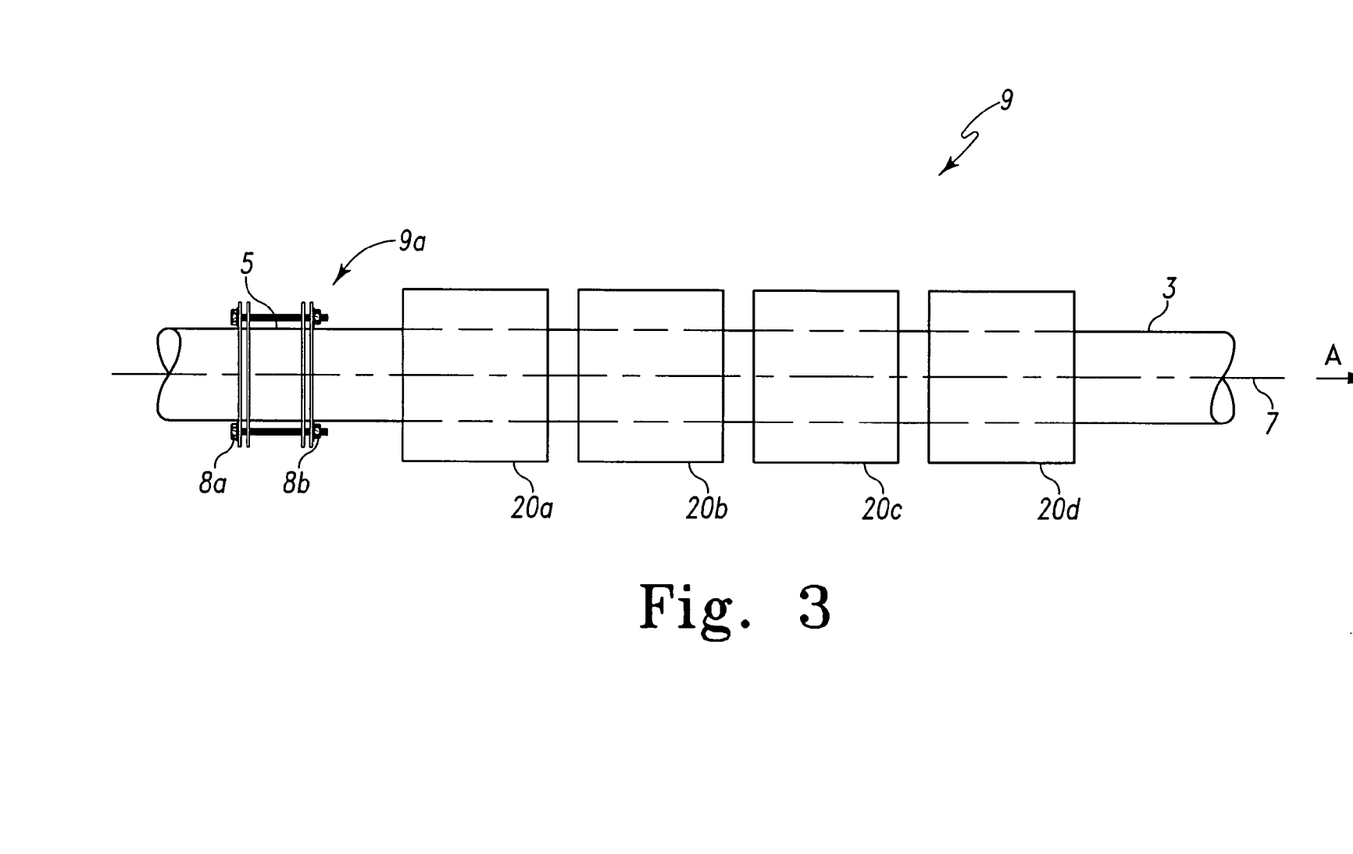
FIG. 3 is a side elevation of another apparatus in accordance with the invention with a conical disc insert.

FIG. 3 shows another assembly 9 in accordance with the invention in which appropriate references have been used for individual elements instead of descriptions. The flow pipe 3 is now surrounded by four permanent magnets 20a, 20b, 20c, and 20d which have been placed sequentially behind each other inside the flow pipe 3 in the direction of the water flow A. Such an apparatus will allow suppression, for example, of undesirable algae and virus growth during by-pass circulation in swimming pools.

Figure 4:
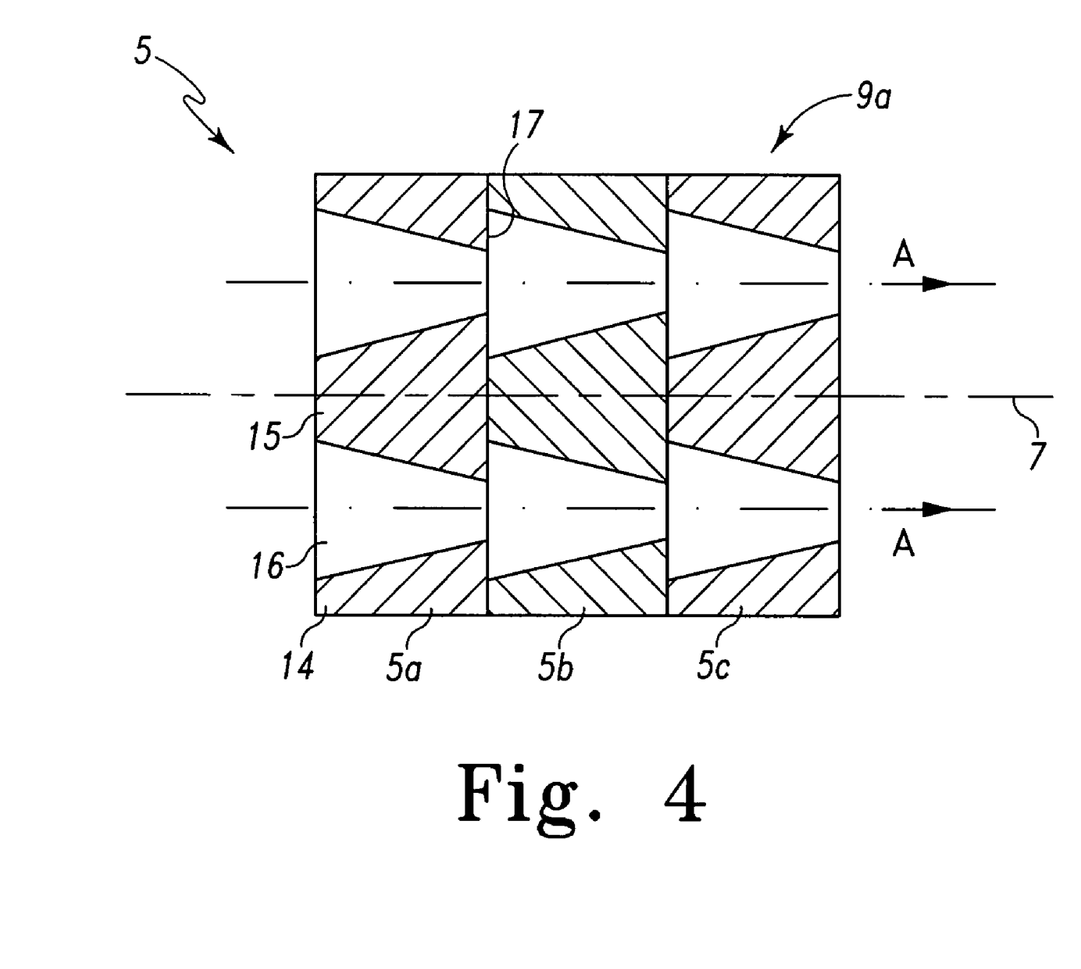
FIG. 4 is a sectional view of conical discs of the present invention.

An assembly 9a of conical discs 5 is placed at the input opening inside the flow pipe 3. These discs 5 are attached to the flow pipe 3 with the flanges 8a and 8b. This arrangement of conical discs 5 is illustrated in FIG. 4 in more detail. This assembly 9a altogether includes three conical discs 5a, 5b, and 5c whose outer walls 14 converge in flow direction A of the water. As shown in FIG. 4, a cone-shaped section and/or central core 15 each with expanding walls in flow direction A is present in the center axis 7 of the conical discs 5a, 5b, and 5c. This arrangement results in a narrowing flow opening 16, which forms in rotational symmetry around the axis 7 of the conical disc assembly 9a between each cone-shaped section and the outer wall 14 of each conical disc. This flow opening 16 widens suddenly at the transition point to the next conical disc. The turbulent flow pattern, which is thus created at these points enhances the formation of liquid crystals in the water.

The conical discs 5a, 5b, 5c and/or the cone-shaped middle spikes 15 can themselves be formed as permanent magnets in accordance with the invention. In this case the permanent magnets 20a to 20d shown in FIG. 3 are not required.

Figure 5:
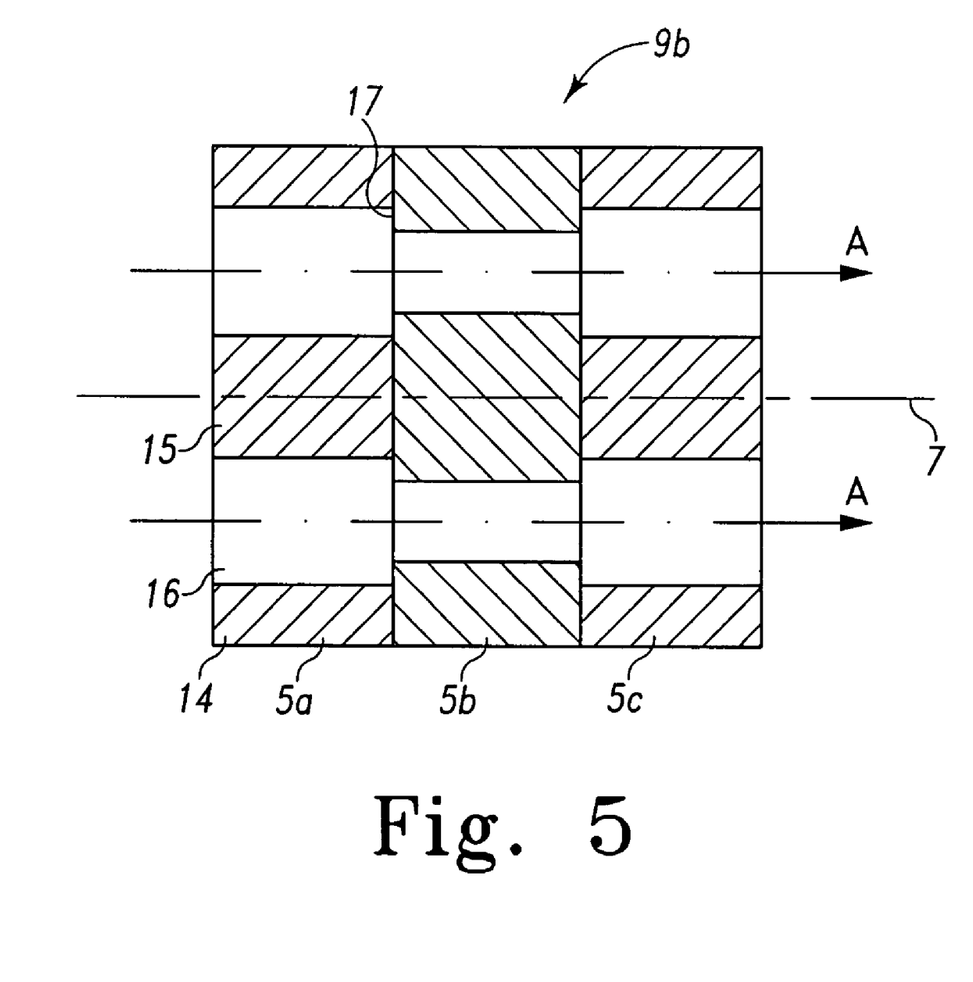
FIG. 5 is a sectional view similar to FIG. 4 of other apparatus of the present invention for generating flow vortices.

FIG. 5 shows another apparatus 9b for generating turbulent flow patterns, which can be used as an alternative to the conical discs displayed in FIGS. 3 and 4. This apparatus 9b is characterized by several discs 5a, 5b, and 5c, which each have an outer wall 14 and a middle spike 15 and are placed behind each other in rotational symmetry around the central axis 7 of these discs 5a to 5c. This arrangement 9b creates a volume 16 between the spike 15 and the outer wall 14, in which the fluid can flow in the direction of the arrows A. The radius values of the central spikes 15 and the inner radius values of the outer walls 14 are chosen in such a way that the cross-section of the volumes 16 changes from one disc 5a to the next disc 5b and from 5b to 5c, respectively. The vortices forming at the transition points 17 will cause a turbulent flow. An assembly 9b of the kind shown in FIG. 5 will also enhance and execute the treatment of the water, if the conical discs 5a, 5b, 5c and/or the middle spikes 15 are formed as permanent magnets in accordance with the invention.

Figure 6:
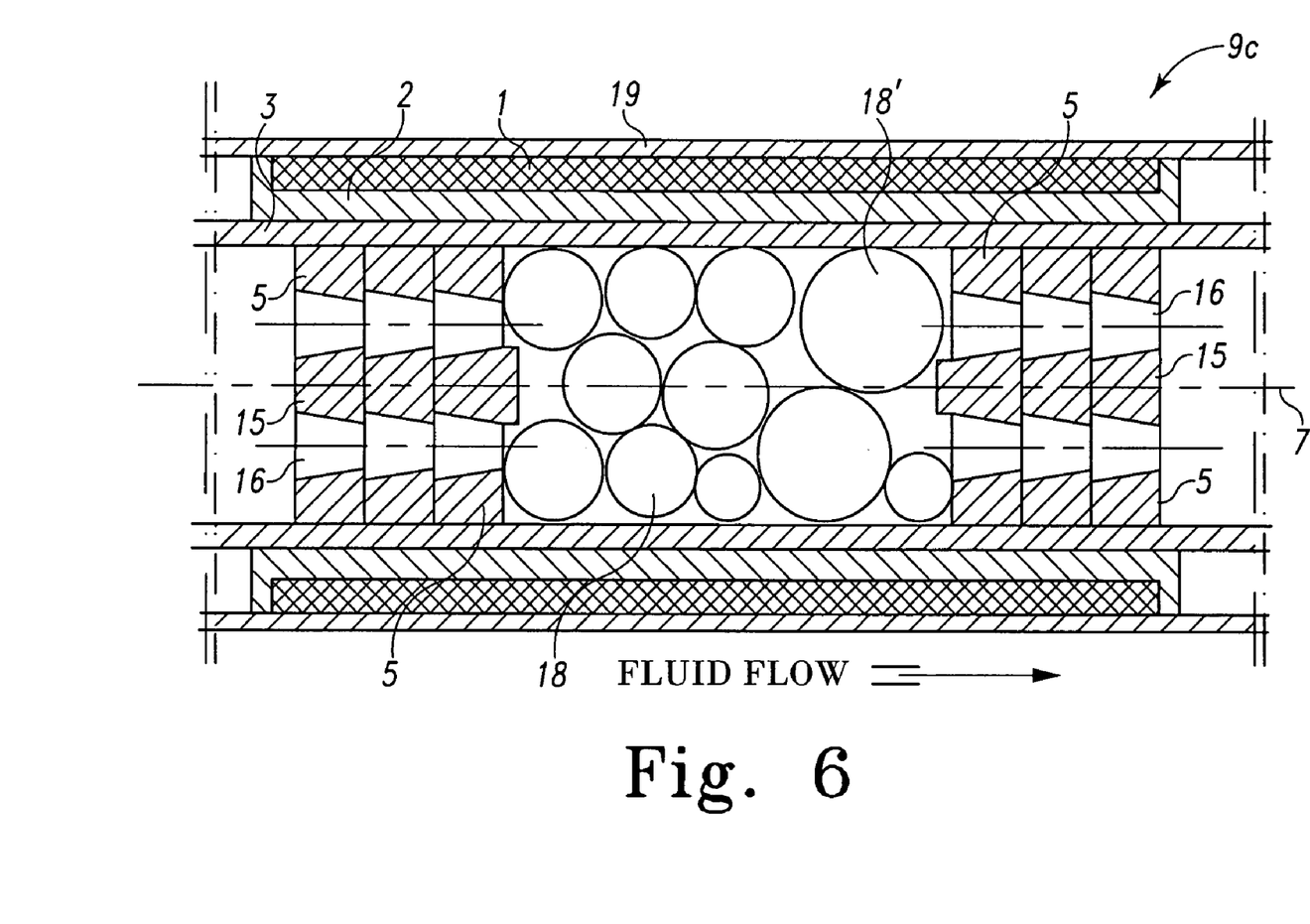
FIG. 6 is a sectional view of still another apparatus for generating flow vortices.

FIG. 6 shows another apparatus 9c in accordance with the invention containing a flow pipe 3 that additionally is surrounded by a Klein coil 1 and core 2, respectively, as described above. This coil 1 is also enclosed in an outer protective pipe 19. Two groups of conical discs 5 are inside the flow pipe 3. Each of these groups contains three form-fitting neighboring conical discs 5 with a middle spike or core 15, thus forming ring-shaped ducts 16. The two groups of three conical discs 5 are arranged with space between them. The space between these two groups of conical discs 5 inside the flow pipe 3 is filled with vortex bodies, e.g. with glass beads 18 and 18', of variable sizes as in this particular example. These vortex bodies 18 ensure that turbulent flow exists at all available flow speeds between the vortex discs 5 of both groups along the complete length of the flow pipe 3. The vortex bodies 18 and 18' can themselves take the form of quasi-single pole magnets, etc.

Figure 7:
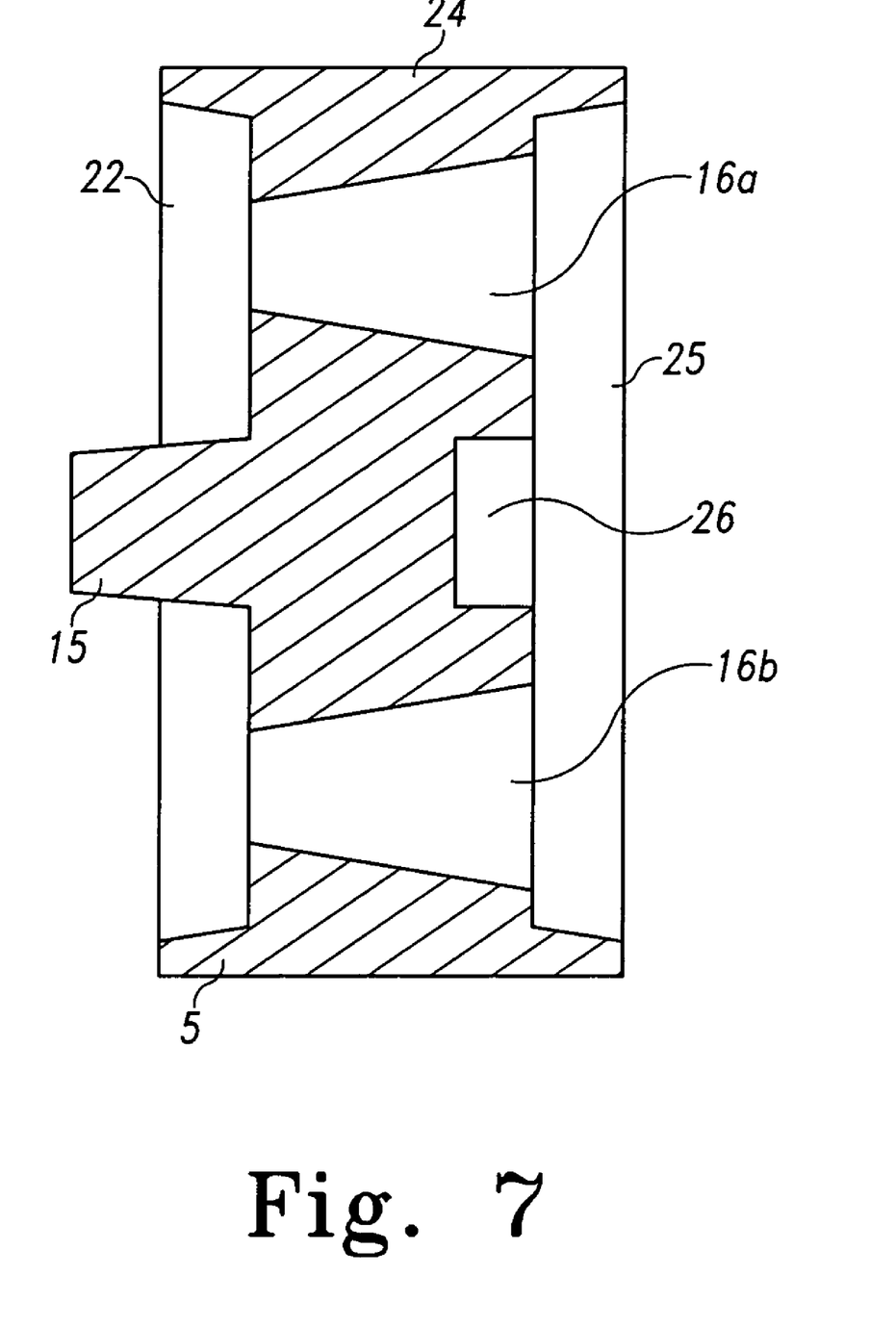
FIG. 7 is a sectional view of yet another apparatus for generating flow vortices.

FIG. 7 shows another form of a conical disc 5 for the generation of flow vortices. This conical disc 5 again has a middle spike 15 around which a total of four conical holes 16 with a diameter of 8 to 12 mm are arranged. The two openings 16a and 16b of these conical holes 16 are depicted in the cross-section of FIG. 7. A first rim 22 projects in the direction of middle spike 15 from an outer edge 24 of the disc 5. A second rim 25 projects in an opposite direction. The two rims 22 and 25 are so dimensioned as to contact similar rims of adjacent identical discs 5, with the middle spike 15 of one disc 5 being received into the central cavity 26 of an adjacent disc 5.

Figure 8A:
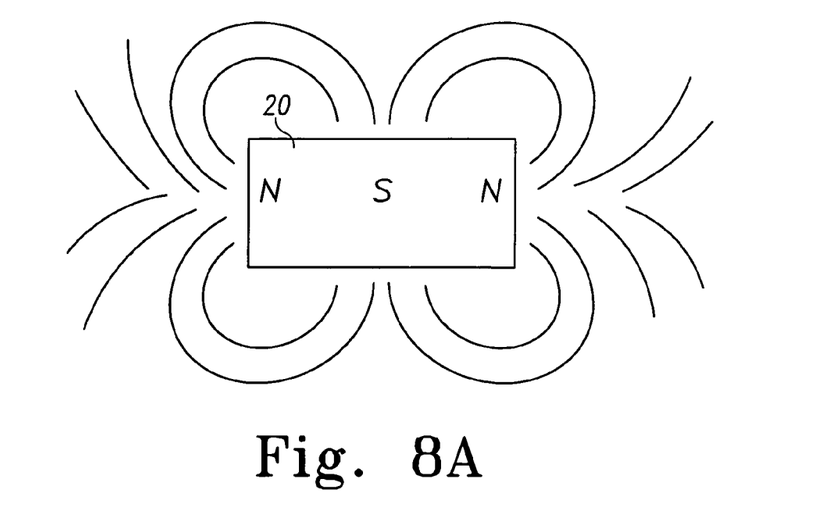
FIGS. 8A and 8B are schematic drawings of the polar structure of permanent magnets that can be used in the present invention.
Figure 8B:
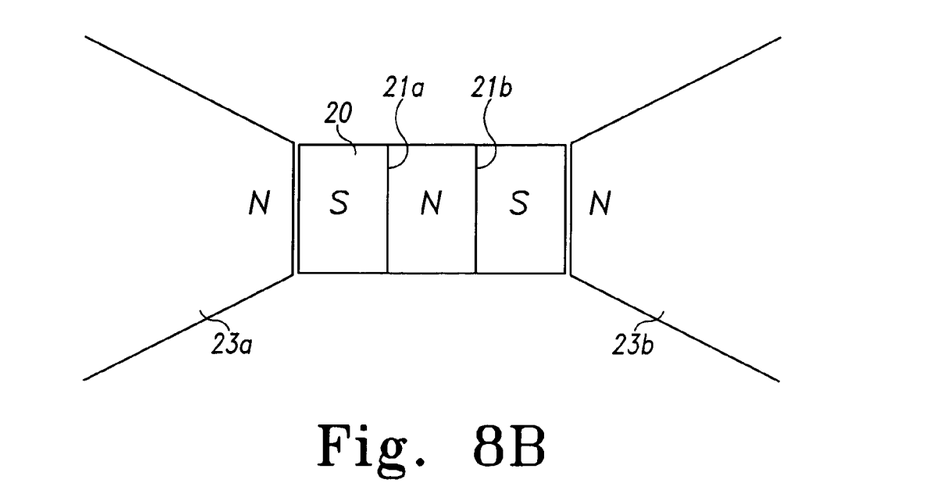

FIGS. 8A and 8B show permanent magnets 20, which are to be used in the present invention as well as their production. The permanent magnets 20 in the present invention have an outer magnetic field, which corresponds to one generated by a Klein double coil through which a direct current flows, i.e., with an infinite divergence on the individual poles as illustrated in FIG. 1.

FIG. 8A shows a magnet 20, which has a magnetic north on both of its ends and a magnetic south in the middle. The field lines are not closed, so that this permanent magnet 20 has the external effect of a monopolar (magnetic north) permanent magnet. Such quasi-single pole permanent magnets are, for example, described by Shinichi SEIKE (see above). The permanent magnet in FIG. 8A can now take the shape of a sleeve which is inserted in the flow pipe 3 or which surrounds the flow pipe 3 as previously illustrated in FIGS. 3 and 2, respectively.

FIG. 8B shows a tripolar magnet 20 also described by Shinichi SEIKE (see above). This tripolar magnet 20 has a magnetic south on both of its ends and a magnetic north in its middle. The poles of this permanent magnet 20 are separated from one another by a diamagnetic separation element that in the present case can be formed by a thin copper foil 21a or a thin copper sheet 21b.

FIG. 8B furthermore shows pole shoes 23a and 23b of common magnets, which sit on the permanent magnet 20, each with their magnetic north. This allows the creation of a permanent magnet as represented in FIG. 8B. Alternatively, however, such permanent magnets obtained by magnetization inside a Klein double coil through which a current is flowing. Hence it is possible in such a double coil to harden any substance containing ferromagnetic components. These will then align during hardening in the field generated by the Klein double coil, thereby creating a permanent magnet with a corresponding field distribution.

As a conclusion it is to be noted that by combination of suitable permanent magnets, e.g. in the form of flow discs or flow sleeves, central cores and middle spikes, respectively, in any number and with any relative orientation of the poles, the topology of the magnet field generated in the flow pipe can be arbitrarily set and influenced.

What is claimed is:

1. Apparatus for treating fluids, comprising a flow pipe for containing a flow of a fluid to be treated and at least one permanent magnet situated adjacent to a surface of the flow pipe, the permanent magnet having axial ends exhibiting an infinite divergence of the magnetic field generated by the permanent magnet, a plurality of disks situated in the flow pipe for generating turbulent flow conditions, each disk including at least one opening, the at least one opening in each disk having a larger opening end and a smaller opening end, the plurality of disks being serially positioned so that an edge of a smaller end of one opening in one of the disks overlaps a larger opening end of one of the openings in an adjacent disk.

2. Apparatus in accordance with claim 1, wherein the at least one opening in each of the plurality of disks comprises a plurality of conical openings around a central spike.

3. Apparatus in accordance with claim 1, wherein the plurality of disks are arranged in at least two groups within the flow pipe with a space between adjacent groups of disks.

4. Apparatus in accordance with claim 3, further comprising a plurality of vortex bodies are arranged in at least one of the spaces between adjacent groups of disks.

5. Apparatus in accordance with claim 4, wherein at least some of the vortex bodies are of varying sizes.

6. Apparatus in accordance with claim 4, wherein the vortex bodies consist of beads.

7. Apparatus in accordance with claim 6, wherein the beads consist essentially of glass.

8. Apparatus in accordance with claim 1, wherein the at least one permanent magnet comprises a plurality of magnets arranged with any magnetic polarity towards one another.

9. Apparatus in accordance with claim 8, further comprising a dielectric foil situated between poles of adjacent permanent magnets.

10. Apparatus in accordance with claim 8 wherein the dielectric foil consists essentially of copper.

11. Apparatus in accordance with claim 1, wherein the at least one permanent magnet comprises a plastic coextrudate with a ferromagnetic material.

12. Apparatus in accordance with claim 11, wherein the ferromagnetic material consists essentially of iron powder, iron dust or iron chips.

13. Apparatus in accordance with claim 1, wherein the at least one permanent magnet comprises a series of permanent magnets arranged along the flow pipe one after the other.

14. Apparatus in accordance with claim 1, wherein the at least one permanent magnet comprises a sleeve concentric with the flow pipe wall.

15. Apparatus in accordance with claim 1, wherein at least one of the permanent magnets is placed inside the flow pipe for generating turbulent flow conditions.

* * * * *